United States Patent Office 2,799,555
Patented July 16, 1957

2,799,555

METHOD OF SEPARATING PLUTONIUM

Frank Morgan, Chalk River, Ontario, Canada, assignor, by mesne assignments, to the United States of America as represented by the United States Atomic Energy Commission No Drawing. Application September 25, 1946, Serial No. 699,345

10 Claims. (Cl. 23—14.5)

This invention relates to a method of separating plutonium from a mixture thereof with uranium and fission products of uranium, including zirconium and niobium. Such a mixture is obtained in heterogeneous or homogeneous arrangements for releasing atomic energy by means of a divergent neutron chain reaction carried out in a pile. Natural uranium serves in the pile as a source of the plutonium and fission products of uranium, and the mixture is found, in the case of a heterogeneous arrangement, in the neutron irradiated rods of uranium or, in the case of a homogeneous arrangement, in the neutron irradiated dispersion or solution of uranium compound. The fission products which are of interest from the point of view of the separation are those of relatively long life and include isotopes of zirconium, niobium, ruthenium, strontium, yttrium, cerium, praseodymium, barium and lanthanum. The total weight of these fission products in the irradiated uranium is extremely small. In a 50 kilogram irradiated uranium rod it may be of the order of 10 grams depending on the degree of irradiation.

It has previously been proposed that the separation in question be effected by co-precipitating plutonium and a carrier compound from solution, dissolving the precipitate, oxidising the plutonium from the tetravalent state ($Pu^{4+}$) to the hexavalent state ($Pu^{6+}$), and reprecipitating the carrier compound with any $Pu^{4+}$, leaving the $Pu^{6+}$ in solution. Such a method involves many cycles of operation.

According to the present invention a method of separation is provided which gives a high yield of plutonium, is convenient and does not require many cycles of operation and so requires less time than methods previously proposed.

The method of the invention consists essentially in dissolving the mixture of plutonium with uranium and fission products of uranium in nitric acid, adding bismuth and zirconium nitrates to the solution as carrier compounds, precipitating insoluble phosphates of plutonium, zirconium, bismuth and niobium from the solution by adding to the latter an aqueous solution of a soluble phosphate, treating the precipitated phosphates with oxalic acid, whereby the compounds of zirconium and niobium are rendered soluble and an insoluble precipitate of bismuth and plutonium oxalates is formed, and separating the plutonium from the bismuth.

The dissolution of the mixture in the form, for instance, of an irradiated uranium rod from a neutron chain reaction pile is effected in nitric acid not only because that acid dissolves the mixture most satisfactorily, but also because it does not attack stainless steel vessels in which it is desirable that the dissolution be carried out. Preferably the dissolution is carried out in such a way that the residual nitrate solution contains about 3 N free nitric acid and about 5% by weight of uranium in the form of uranyl nitrate. The amount of bismuth nitrate added to the resulting solution is preferably not less than about ten times the amount of zirconium nitrate added. The soluble phosphate which is then added is preferably sodium dihydrogen phosphate in the form of a 50% or saturated aqueous solution, the result of this addition being that the plutonium, zirconium, bismuth and niobium in the solution are precipitated in the form of insoluble phosphates, which are separated from the solution in which the uranium and other fission products remain.

A most important feature of the invention is the addition of the two carrier compounds, bismuth nitrate and zirconium nitrate. The bismuth phosphate resulting from the addition of bismuth nitrate to the solution increases the bulk of the precipitates and renders the latter more granular in character so that settling and decantation or filtering is facilitated. The zirconium phosphate resulting from the addition of zirconium nitrate provides a substrate for the radioactive zirconium isotope and for the plutonium, the carrying down of which into the precipitate it thus assists. The niobium is a strongly γ-active fission product chemically very similar to zirconium and thus follows the latter throughout the treatment.

By treatment of the mixed phosphate precipitate with oxalic acid, the zirconium and niobium phosphates are rendered soluble in the form of a complex together with a small proportion (about 2%) of the plutonium phosphate, and an insoluble residue of bismuth oxalate carrying the plutonium precipitate as oxalate is formed. The zirconium oxalate appears to be adsorbed on the bismuth oxalate to an extent of less than 2%. Finally the plutonium compound in the insoluble residue is separated from the bismuth compound.

The separation of the plutonium from the bismuth in the insoluble residue may be effected in a variety of ways. According to one way of effecting the separation the insoluble oxalates are converted to a solution of corresponding chlorides by treatment with hydrochloric acid and the bismuth is then precipitated from the resulting solution as sulphide by treating the mixed chloride solution with hydrogen sulphide, the residual solution being evaporated to obtain plutonium chloride. A second way of effecting the separation is a modification of the first. According to it the bismuth and plutonium oxalates are converted to oxides by treatment with caustic soda, preferably of a strength of 6 N, the oxides are then converted to chlorides by treatment with hydrochloric acid, and the bismuth removed from the resulting solution, as above described.

The following example will serve to illustrate the invention:

*Example*

1.8 grams of irradiated uranyl nitrate are taken up in 17 ml. of 3 N nitric acid. 17 mg. of bismuth and 3 mg. of zirconium as nitrates are added, and then 3.4 grams of sodium hydrogen phosphate in solution (500 g. per liter) are added. After fifteen minutes a further 17 mg. of bismuth as nitrate is added, and the resulting precipitate, after standing two hours, is removed and washed with sodium hydrogen phosphate solution (50 grams per liter). This step leaves the uranium in the solution.

The precipitate is treated for two hours with 5 ml. of oxalic acid solution (20 mg. per ml.) and then 2 mg. further of bismuth as nitrate solution are added and precipitated in the solution, this further precipitate scavenging the solution of the small amounts of plutonium which are dissolved. The bismuth is changed to insoluble oxalate and the plutonium appears as insoluble oxalate with the bismuth oxalate.

The insoluble oxalate precipitate is recovered and dissolved in just enough hydrochloric acid for dissolution, the acid being preferably of a strength of 1.5 N. Hydrogen sulphide is bubbled through the resulting solution until precipitation of bismuth in the form of bismuth sulphide is complete. The precipitate is removed from the solution and the latter is then evaporated to obtain a concentrated solution of plutonium chloride. The quantity of fission products which follows to this stage is less than $10^{-4}$ of the quantity originally present in the irradiated uranium and about 96% of the plutonium present in the starting material is recovered.

What I claim as my invention is:

1. The method of separating plutonium from a mixture thereof with uranium and fission products of uranium including zirconium and niobium, which comprises dissolving the mixture in nitric acid, adding bismuth and zirconium nitrates to the resulting solution, adding an aqueous solution of a soluble phosphate, thus causing precipitation of insoluble phosphates of plutonium, zirconium, bismuth and niobium, treating the precipitated phosphates with oxalic acid, whereby the compounds of zirconium and niobium are rendered soluble and an insoluble residue of bismuth and plutonium oxalates is formed, and separating the plutonium from the bismuth.

2. The method according to claim 1, in which the mixture is dissolved in nitric acid in such a way that the nitrate solution contains about 3 N free nitric acid.

3. The method according to claim 1, in which the soluble phosphate is sodium dihydrogen phosphate.

4. The method according to claim 1, in which the mixture is dissolved in nitric acid in such a way that the nitrate solution contains about 3 N free nitric acid, and in which the soluble phosphate is sodium dihydrogen phosphate.

5. The method according to claim 1, in which the amount of bismuth nitrate added to the solution is not less than about ten times the amount of zirconium nitrate so added.

6. The method according to claim 1, in which the mixture is dissolved in nitric acid in such a way that the nitrate solution contains about 3 N free nitric acid, the soluble phosphate is sodium dihydrogen phosphate, and the amount of bismuth nitrate added to the solution is not less than about ten times the amount of zirconium nitrate so added.

7. The method according to claim 1, in which the plutonium is separated from the bismuth by converting the insoluble oxalates to a solution of the corresponding chlorides and then precipitating the bismuth as sulphide from said solution.

8. The method according to claim 1, in which the plutonium is separated from the bismuth by treating the insoluble oxalates with a concentrated solution of caustic soda to convert them to oxides, treating the oxides with hydrochloric acid to convert them to a solution of chlorides, and then precipitating the bismuth as sulphide from said solution.

9. In the method of separating plutonium from a mixture thereof with uranium and fission products of uranium including zirconium and niobium in which the mixture is dissolved in nitric acid and a solution of a soluble phosphate is added to the resulting solution to produce an insoluble precipitate of phosphates of plutonium, zirconium and niobium, the step which comprises adding bismuth nitrate and zirconium nitrate to said solution.

10. In the method of separating plutonium from a mixture thereof with uranium and fission products of uranium including zirconium and niobium in which the mixture is dissolved in nitric acid and a solution of a soluble phosphate is added to the resulting solution to produce an insoluble precipitate of phosphates of plutonium, zirconium and niobium, the step which comprises adding bismuth nitrate and zirconium nitrate to said solution in the proportion of not less than about ten times as much bismuth nitrate as zirconium nitrate.

No references cited.